Oct. 25, 1949.　　　F. A. NEWMAN　　　2,485,984
LAWN MOWER

Filed Aug. 30, 1945　　　　　　　　2 Sheets-Sheet 1

Frederick A. Newman
INVENTOR.
BY Chas Denegre
Attorney

Oct. 25, 1949.　　　　F. A. NEWMAN　　　　2,485,984
LAWN MOWER
Filed Aug. 30, 1945　　　　　　　　　　　2 Sheets-Sheet 2
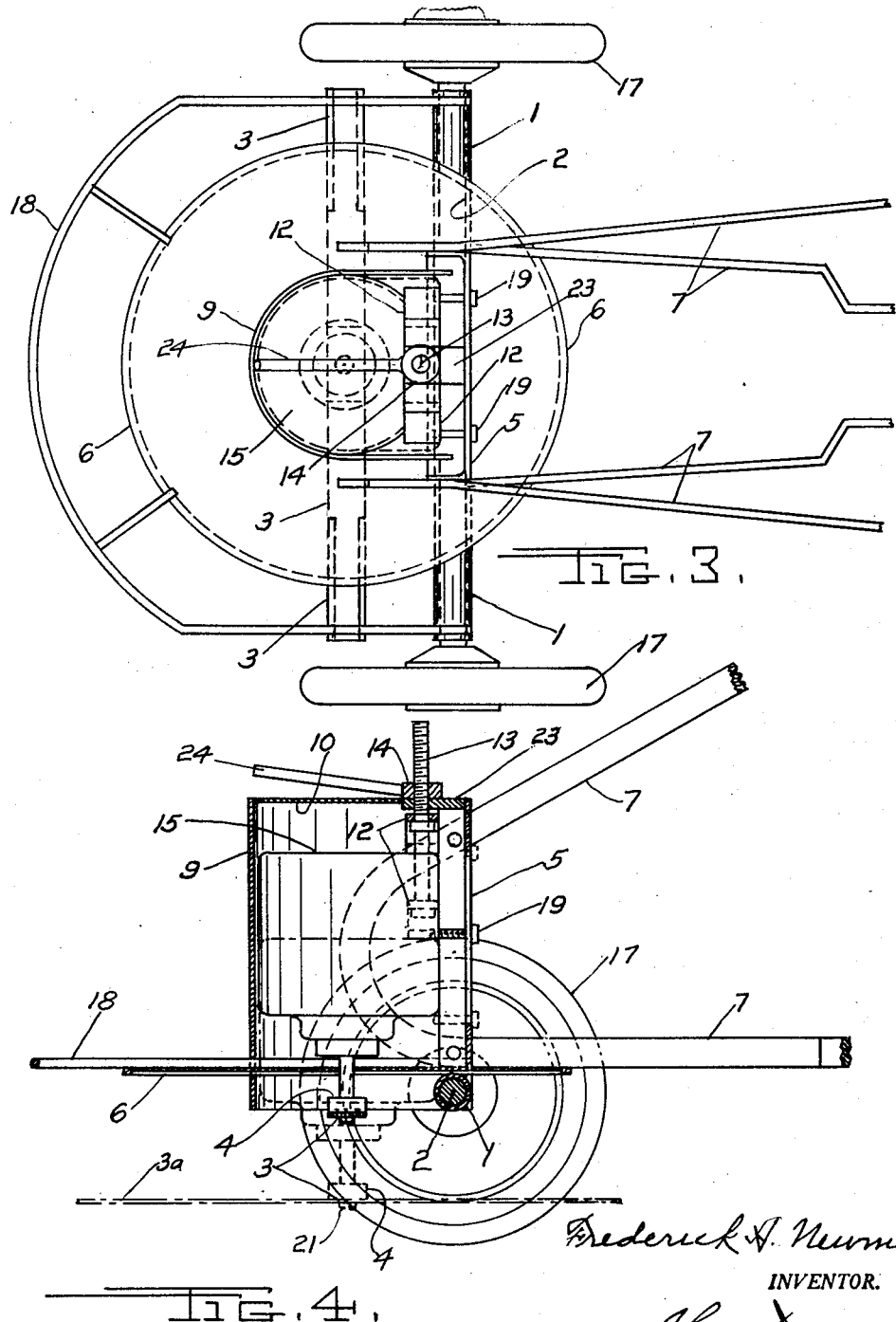
Frederick A. Newman
INVENTOR.
BY Chas Denegre
Attorney.

Patented Oct. 25, 1949

2,485,984

UNITED STATES PATENT OFFICE 2,485,984

LAWN MOWER

Frederick A. Newman, Birmingham, Ala.

Application August 30, 1945, Serial No. 613,534

1 Claim. (Cl. 56—25.4)

This invention relates to lawn mowers and has for its main objects to provide a mower that is highly efficient, easy to operate, cheap to manufacture, and requires very little attention to keep it in working order. Other objects and advantages will appear from the drawings and description.

The present mower is power driven either by electric or internal combustion motor, the electric power being supplied from an outside source not shown.

It is provided with a revolving horizontal blade that has four cutting edges so that when two cutting edges become dull the blade may be reversed to use the other two cutting edges before it becomes necessary to remove the blade for a regular sharpening.

Figure 1:
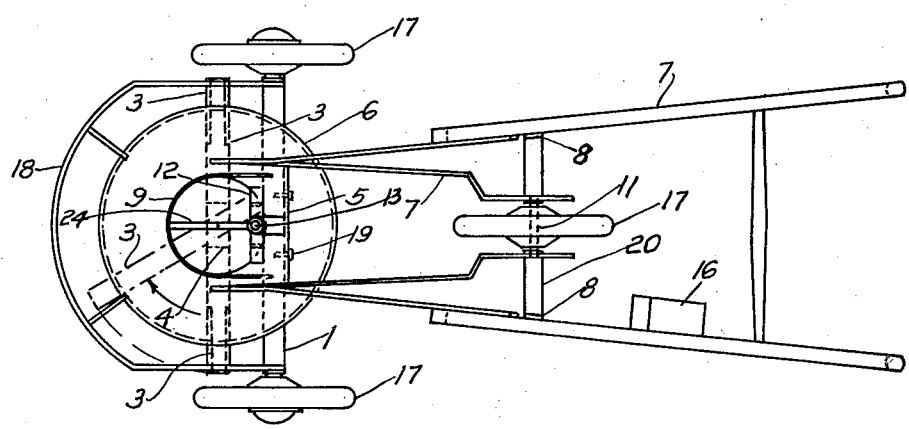
Figure 2:
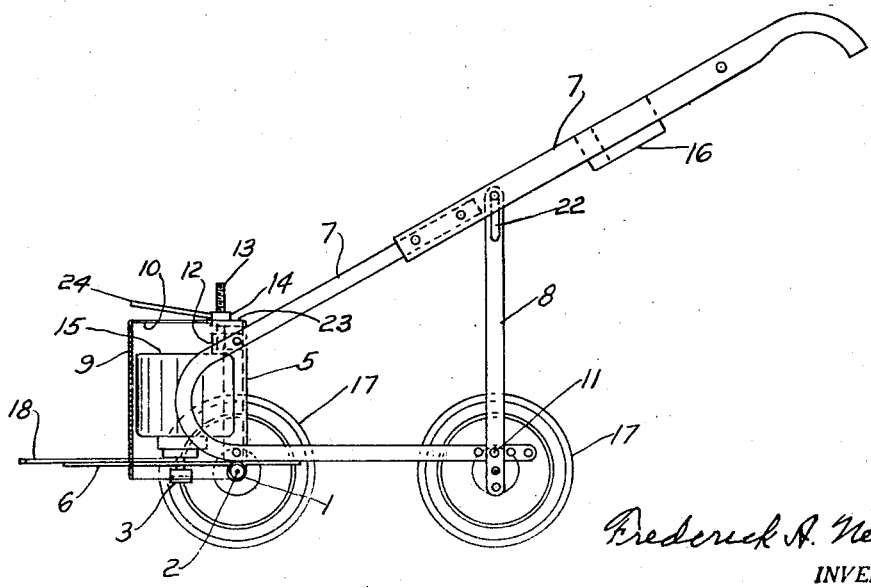

By referring to the drawings, part of this application, it will be observed that Fig. 1 is a plan view of the lawn mower; Fig. 2 is a side view of the lawn mower; Fig. 3 is a large scale plan view of mower less part of handles and rear wheel; and Fig. 4 is a large scale sectional elevational view of mower less part of handles and rear wheel.

Similar reference numerals refer to similar parts throughout the several views.

Again referring to the drawings in detail it will be seen that the device comprises a main axle 2 carried in a housing 1. There is also a rear axle 11 supported in a two part cross member 20 that is attached at its ends near the bottom of arms 8 that are adjustably connected at 22 with the main assembled loop handles 7 that are also adjustable. Three wheels 17 support the mower assembly. An electric motor 15 is carried in a housing 9—10 attached slidably to a support 5 that is mounted upon the main axle housing 1. Attached to the lower end of the motor shaft 21 is a straight narrow flat blade 3 with hub 4 and four cutting edges so that when two cutting edges become dull the blade can be detached and reversed to use the other two edges. This blade is adapted to be revolved by the motor at high speed. The motor is adapted to be raised or lowered in its housing by means of a screw bolt 13 attached by its head portion 12 to the motor. A base bearing 23 supports a round screw collar 14 that is provided with a handle 24 for revolving the screw collar for raising or lowering the motor to set the blade, for instance in its lowest position 3a to cut grass very short. After the motor and blade are set at the desired height the clamp bolts 19 are set tight to hold the motor and blade in fixed position for operation. For safety an outer guard 18 is carried on the front of the assembly, and also a guard 6 over the blade. An electric switch 16 for control of the motor is carried on one of the handles.

The mower may be made of any material best suited for the purpose. While I prefer to use an electric motor where a source of power is available, a small internal combustion motor may be substituted.

While I have shown and described the preferred embodiment of my invention, I do not wish to limit same to the exact and precise details of structure, but reserve the right to make all modifications and changes so long as I remain within the spirit and scope of the following claim.

Having described my invention I claim:

In a power driven lawn mower of the class described comprising; a main frame, a front axle attached to the frame with a wheel on each end of the axle, a rear axle supported in the rear end of the frame, one wheel mounted in the center of the rear axle, a pair of curved looped handles positioned for manual pushing of the mower, the handles continued into the main frame and forming loops therein and extending rearwardly to the rear axle with the one wheel thereon; an electric motor mounted forward of the front axle, the shaft of the motor being perpendicular, a double edge blade attached to the lower end of the motor shaft.

FREDERICK A. NEWMAN.

REFERENCES CITED

The following references are of record in the file of this patent:

UNITED STATES PATENTS

| Number | Name | Date |
| --- | --- | --- |
| 1,805,927 | Sharp | May 19, 1931 |
| 1,831,681 | Miller | Nov. 10, 1931 |
| 1,876,504 | Rossiter et al. | Sept. 6, 1932 |
| 2,243,133 | Steiner et al. | May 27, 1941 |
| 2,308,076 | Hainke | Jan. 12, 1943 |